United States Patent [19]

Kittel

[11] Patent Number: 4,592,460
[45] Date of Patent: Jun. 3, 1986

[54] CLUTCH DISC

[75] Inventor: Friedrich Kittel, Schweinfurt, Fed. Rep. of Germany

[73] Assignee: Fichtel & Sachs AG, Schweinfurt, Fed. Rep. of Germany

[21] Appl. No.: 702,463

[22] Filed: Feb. 19, 1985

[30] Foreign Application Priority Data

Feb. 18, 1984 [DE] Fed. Rep. of Germany ....... 3405949

[51] Int. Cl.[4] .............................................. F16D 3/66
[52] U.S. Cl. ................................. 192/106.2; 192/70.17
[58] Field of Search ............... 192/106.2, 106.1, 70.18, 192/70.17, 70.16; 464/66, 67, 68

[56] References Cited

U.S. PATENT DOCUMENTS

| 3,684,070 | 8/1972 | Maucher | 192/106.2 |
| 4,122,931 | 10/1978 | Maucher | 192/106.2 |
| 4,274,525 | 6/1981 | Raab et al. | 192/106.2 |
| 4,354,586 | 10/1982 | Stanley | 192/106.2 |
| 4,548,310 | 10/1985 | Maucher | 192/106.2 |

FOREIGN PATENT DOCUMENTS

| 2318908 | 10/1974 | Fed. Rep. of Germany . |
| 3121376 | 12/1982 | Fed. Rep. of Germany . |
| 1461329 | 1/1977 | United Kingdom . |
| 2111642 | 7/1983 | United Kingdom . |

Primary Examiner—George H. Krizmanich
Attorney, Agent, or Firm—Toren, McGeady, Stanger, Goldberg & Kiel

[57] ABSTRACT

The clutch disc for a motor vehicle friction disc clutch comprises a hub part and a disc part mounted rotatably on the hub part. The disc part carries clutch friction linings and is supported through springs with a multi-stage rotational elasticity characteristic on the hub part. Between a side disc of the disc part and a hub disc, an axially resilient control disc is braced. The control disc is supported through a first friction face pair radially within the space defined by the springs on the hub part and through a second friction face pair radially outside this region on the side disc of the disc part. A tab of the control disc couples the control disc with limited rotational play with the hub part. The friction face pairs determine friction torques of different magnitudes and are effective in alternation.

13 Claims, 11 Drawing Figures

FIG. 1
FIG. 2
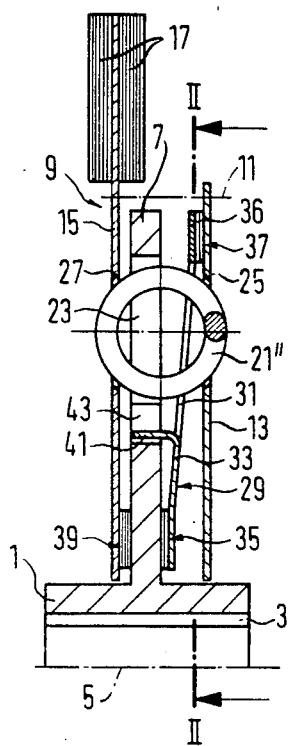
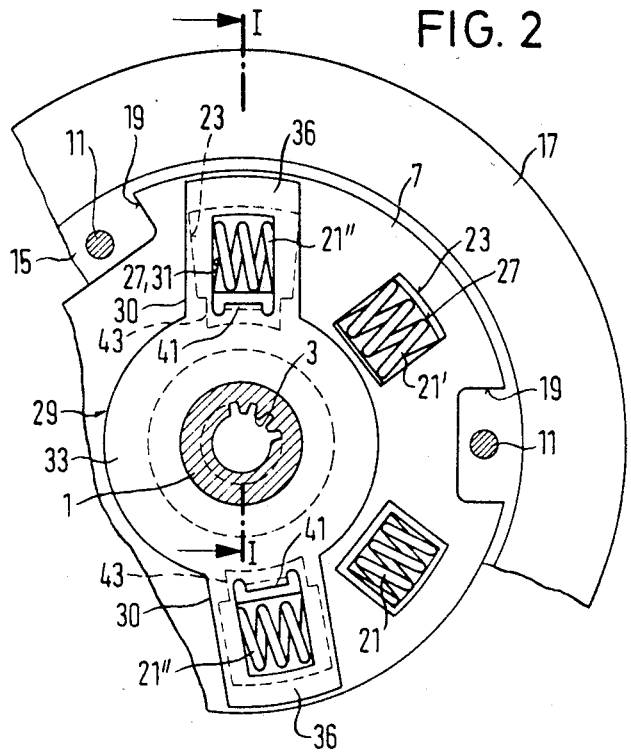
FIG. 3a   FIG. 3b   FIG. 3c
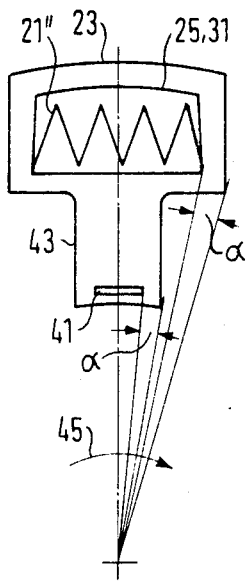
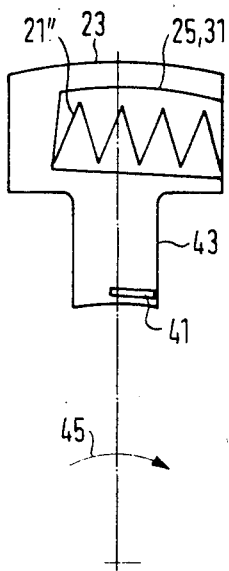
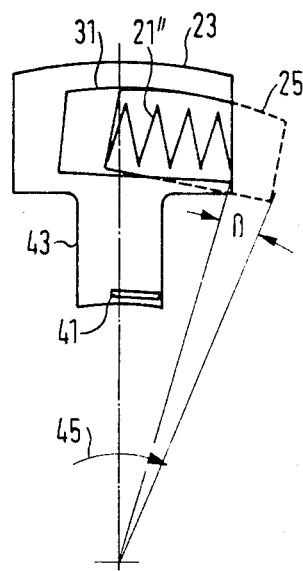

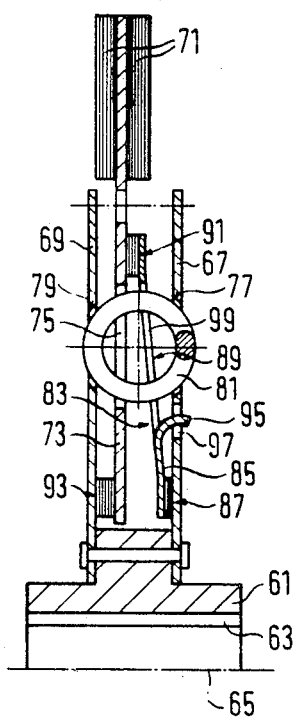
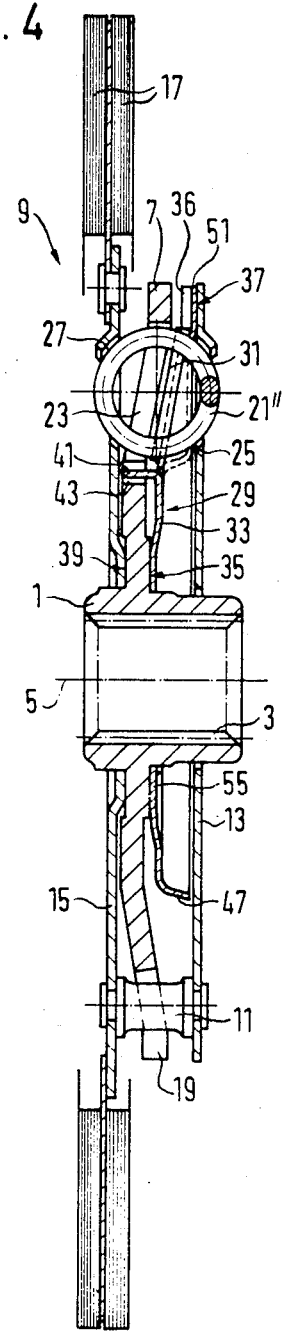
FIG. 4
FIG. 9

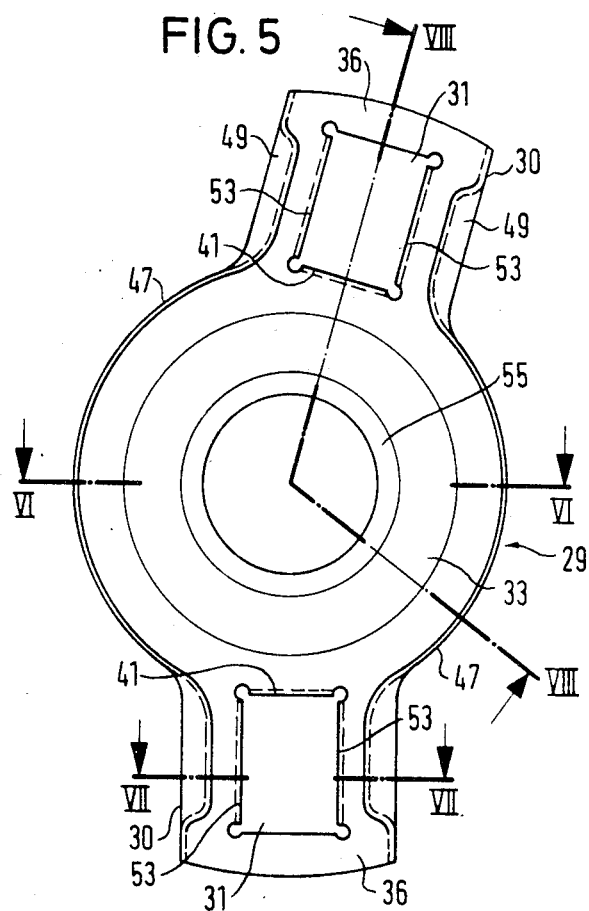
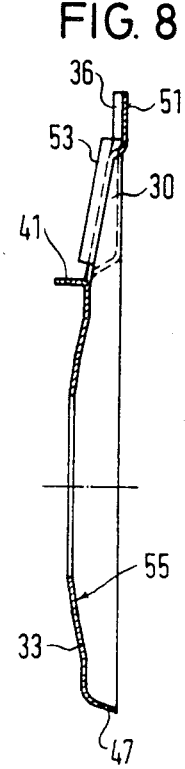
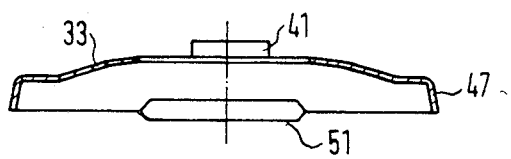
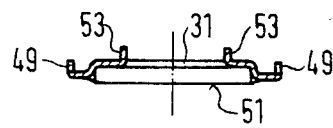

CLUTCH DISC

BACKGROUND OF THE INVENTION

The invention relates to a clutch disc for a motor vehicle friction disc clutch and especially a clutch disc having a multi-stage torsional vibration damper.

From German Publication Specification No. 3,121,376 and German Publication Specification No. 2,318,908, clutch discs for motor vehicle friction disc clutches are known in which a disc part provided with clutch friction linings is mounted rotatably through a limited angle of rotation on a hub part which is to be coupled non-rotatably but axially displaceably with a gear input shaft. The hub part carries a hub disc protruding substantially radially of the rotation axis. The disc part comprises a side disc axially on each side of the hub disc. Springs which can be stressed in the relative rotation of the disc part and the hub part are arranged in windows of the hub disc and the two side discs. Some of the springs are seated in the circumferential direction with play in the windows either of the disc part or of the hub part, so that these springs come into action only after the take-up of the rotary play and the clutch disc shows a multi-stage rotational elasticity characteristic. The clutch disc further comprises two friction dampers, of which a first damper is dimensioned for the under-load range while a second damper is dimensioned for the idling range and transmits a smaller friction torque than the first damper. The underload friction damper is controlled by a control disc in dependence upon the relative angle of rotation between the hub part and the disc part and is out of action in idling operation, that is in the case of small relative angles of rotation. The control disc is arranged axially between one of the side discs of the disc part and the hub disc and co-operates with at least one of the torsional vibration springs. Separate springs for the under-load and idling ranges are provided to generate the friction force of the friction dampers.

OBJECT OF THE INVENTION

It is the object of the invention to produce a clutch disc with multi-stage torsional vibration damper, the production expense of which is as low as possible, especially making one single spring suffice for the friction force generation.

SUMMARY OF THE INVENTION

The invention is based upon a clutch disc for a motor vehicle friction disc clutch in which several springs of a torsional vibration system with stepped rotational elasticity characteristic are provided in the torque transmission path between a hub part and a disc part carrying the clutch friction linings. The clutch disc further comprises at least two friction dampers which are dimensioned for different friction torques, preferably for an idling friction torque and an under-load friction torque. For controlling the operation of the friction damper dimensioned for the higher friction torque a control disc is provided which is supported axially on one side through a friction face pair of said one friction damper on the hub part and on its other side through a friction face pair of the other friction damper on the disc part. The control disc is formed as an axially acting spring also generating the axial pressure application forces of the friction dampers. In this way the production expense of the clutch disc can be kept low.

The control disc is preferredly formed as an axially acting spring part substantially of annular disc form which is supported via the friction face pairs with its internal circumference on the one hand and its external circumference on the other on the hub part and the disc part respectively. If only by reason of the different effective radii of the friction face pairs, friction torques of different magnitudes result. On the other hand the friction torque can be additionally influenced by suitable selection of the friction values of the paired friction faces. In order to obtain maximum friction radii and thus the most different possible friction torques, said one friction face pair is arranged radially within the region outlined by the torsional vibration springs, while the other friction face pair is provided radially outside this region. The friction face on the control disc side of the radially outer friction face pair is expediently formed by the free end of an arm protruding radially from the control disc.

The control disc is preferably a part of annular disc form which is stiffened on its external circumference, for example by an axially bent-over edge. If a radially protruding arm is provided, this expediently merges rigidly in flexion into the annular disc part. The control disc is formed as a dished spring in the region of the internal circumference of the annular disc part.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 shows a diagrammatic axial longitudinal section through one half of a first embodiment of a clutch disc for a motor vehicle friction disc clutch, seen along a line I—I in FIG. 2;

FIG. 2 shows a partial diagrammatic axial cross-section through the clutch disc, seen along a line II—II in FIG. 1;

FIGS. 3a to 3c show diagrammatic representations of a detail of the clutch disc according to FIGS. 1 and 2, in order to explain its manner of operation;

FIG. 4 shows a more detailed axial cross-section of a clutch disc assembled according to the principle of the clutch disc according to FIGS. 1 and 2;

FIG. 5 shows an axial view of a control disc used in the clutch disc according to FIG. 4;

FIG. 6 shows a cross-section through the control disc seen along a line VI—VI in FIG. 5;

FIG. 7 shows a cross-section through the control disc, seen along a line VII—VII in FIG. 5;

FIG. 8 shows a cross-section through the control disc, seen along a line VIII—VIII in FIG. 5 and FIG. 9 shows a diagrammatic axial longitudinal section through one half of a second embodiment of a clutch disc for a motor vehicle friction disc clutch.

DETAIL DESCRIPTION OF THE INVENTION

The clutch disc as represented in FIGS. 1 and 2 comprises a hub 1 of sleeve form which is couplable non-rotatably but axially displaceably through an internal toothing 3 with a gear input shaft (not shown further) rotating about a rotation axis 5, of the motor vehicle. The hub 1 carries a substantially radially protruding hub disc 7. On the hub 1 there is rotatably mounted a disc part 9 which comprises two side discs 13, 15. The side discs 13, 15 are arranged on axially opposite sides of the hub disc 7 and are firmly connected with one another by distance rivets 11 or the like. The side disc 15 carries clutch friction linings 17. The distance rivets 11 pass through apertures 19 of the hub disc 7, whereby the maximum angle of rotation of the disc part 9 in relation to the hub 1 is limited. The disc part 9 is supported rotationally elastically through several springs 21 on the hub disc 7 and thus the hub 1.

The springs 21, which are helical compression springs in one or more parts, are seated in windows 23 of the hub disc 7 and axially adjacent windows 25 and 27 of the side discs 13 and 15 respectively, and are stressed in the relative rotation between the disc part 9 and the hub disc 7. While at least one of the springs, in FIG. 2 the spring 21′, is held without play in the circumferential direction in the windows 23, 25, 27, at least one further spring, the two springs 21″ in FIG. 2, is guided with play in the circumferential direction in the window 23 of the hub disc 7. In total a multi-stage rotational elasticity characteristic of the springs 21 results. The spring 21′ is stressed in every relative angle position between disc part 9 and hub 1. The spring 21″ is stressed in the underload range only after the take-up of the idle play in its window 23. It is to be understood that the spring characteristics and also the plays in rotation at which the individual springs come into action can be different.

Axially between the side disc 13, that is the side disc not provided with the clutch friction linings 17, and the hub disc 7 there is arranged a control disc 29, substantially of annular disc form, radially within the region outlined by the springs 21. The control disc 29 carries at least one radially protruding arm 30 which encloses in a window 31 the spring 21″ guided with rotational play in the window 23 of the hub disc 7. Thus the control disc 29 cooperates with the end faces of the springs 21″ placed in the circumferential direction. In the embodiment as illustrated, the control disc 29 has two arms 30 and co-operates with two springs 21″.

The zone of annular disc form, designated by 33, of the control disc 29 forms an axially acting dished spring which is supported in the region of its internal circumference through a friction face pair 35 on the hub disc 7. The arms 29, which lie substantially diametrically opposite to one another, are supported with their free ends 36 radially outside the region enclosed by the springs 21, through a second friction face pair 37 on the side disc 13. The friction spring force path is closed by way of the side discs 13, 15 connected with one another into a unit on the side axially remote from the control disc 29 through a third friction face pair 39 to the hub disc 7. The control disc 29 carries tabs 41 bent over towards the hub disc 7 out of the windows 31 of the arms 29. The tabs 41 engage in apertures 43 of the hub disc 7 with play in the circumferential direction. The apertures 43 are formed by radial inward extensions of the windows 23. The friction face pair 37 is dimensioned for a greater friction torque than the friction face pair 35. The greater friction torque of the friction face pair 37 already results from the larger friction radius and may be adjustable by suitable pairing of the friction coefficients. The friction face pair 39 together with the friction face pair 35 may form an idling friction damper and together with the friction face pair 37 may form an under-load friction damper. The idling friction damper and the under-load friction damper are alternately effective.

The damper system of the clutch disc according to FIGS. 1 and 2 works as follows:

As long as the relative angle of rotation between the disc part 9 and the hub 1 is smaller than the rotational play $\alpha$ fixed by the tabs 41 in the apertures 43 (FIG. 3a), the spring 21″ couples the control disc 29 substantially non-rotatably with the disc part 9. The friction torque is determined by the friction face pairs 35, 39 dimensioned for the idling operation. The rotational play of the springs 21″ in the windows 23 of the hub disc 7 is dimensioned so that it is compensated together with the rotational play of the tabs 41 in the apertures 43 (FIG. 3b). If the relative angle of rotation between the disc part 9 and the hub 1 is further increased (FIG. 3c), the spring 21″ also comes into action and is resiliently stressed between circumferentially opposite edges of the windows 25, 27 for the one part and the window 23 for the other part. On the other hand the control disc 29 is fixed by the tabs 41. The friction torque is therefore determined by the friction face pairs 37, 39 while the friction face pair 35 active in idling operation is bridged over. The under-load rotation angle $\beta$ is limited by the maximum angle of rotation, fixed by means of the distance rivets 11, between disc part 9 and hub 1. As long as the torque exerted in the direction of the arrow 45 by the spring 21″ upon the control disc 29 is greater than the friction torque generated by the friction face pair 37, the friction torque of the friction face pair 37 is generated within the angle $\beta$ without hysteresis, even in rotation contrarily of the arrow 45.

FIGS. 4 to 8 show details of the clutch disc as represented diagrammatically in FIGS. 1 and 2. The region 33 of annular disc form of the control disc 29 is stiffened, as shown by FIGS. 5 to 8, along its external circumference by an axially bent-over edge 47. The bending over is continued at 49 along the radially extending outer edges of the arms 30. Thus the arms 30 are stiffened both in themselves and in their region of transition to the annular disc region 33. The outer ends 36 of the arms 30 protrude axially beyond the contour of the bent-over portions 47 and form a flat friction face 51. The edges of the windows 31 placed in the circumferential direction carry angled-off portions 53 to reduce the pressure per unit area acting upon the springs 21″. The radially inner region of the region 33 of circular disc form extends conically, at least in the uninstalled condition of the control disc 29, and forms a dished spring 55. As FIG. 4 shows, the arms 30 in the region of the windows 31 and the hub flange 7 in the region of the windows 23 extend obliquely of the rotation axis 5 substantially along a diameter of the spring 21–. In this way, a symmetrical loading of the spring 21″ is achieved and at the same time space is provided in the axial direction in the radially inner region of the control disc 29 for the accommodation of the stiffening bent over portion 47.

In FIG. 4 in connection with the friction face pairs 35, 37 and 39 no friction linings or the like are represented. However, friction linings, for example in the form of friction rings or the like, as also thrust rings, can be provided.

FIG. 9 shows a variant of a clutch disc the hub 61 of which is couplable through an internal toothing 63 non-rotatably but axially displaceably with a gear shaft rotating about a rotation axis 65. Two substantially radially protruding side discs 67, 69 are fixed on the hub 61 with axial spacing from one another. A lining carrier disc 73 provided with clutch friction linings 71 is mounted rotatably on the hub 61 through a limited angle of rotation axially between the side discs 67, 69. Springs 81, through which the lining carrier disc 73 is rotationally elastically supported on the hub 61, are arranged in windows 75 of the lining carrier disc 73 for the one part and in windows 77 and 79 of the side discs 67 and 69 respectively for the other part. According to FIGS. 1 and 2, several springs 81 are provided which ensure a multi-stage rotational elasticity characteristic of the clutch disc.

Axially between the side disc 67 and the lining carrier disc 73 an axially resilient control disc 83 is provided the region 85 of annular disc form of which forms a dished spring. The internal circumference of the region 85 of annular disc form is supported radially within the region outlined by the springs 81 through a friction face pair 87 on the side disc 67.

Arms 89 protrude radially outwards from the external circumference of the region 85 of annular disc form and are supported radially outside the region outlined by the springs 81 through a friction face pair 91 on the lining carrier disc 73. The spring force path of the control disc 83 is closed on the side of the lining carrier disc 73 axially remote from the control disc 83 through a third friction face pair 93 to the side disc 69. The control disc 83 carries axially bent-off tabs 95 which engage with play in the circumferential direction in apertures 97 of that side disc 67 on which the internal circumference of the control disc 83 is supported through the friction face pair 87. The spring 81 penetrates a window 99 in the arm 89.

The clutch disc according to FIG. 9 differs from the clutch disc as explained above essentially only in the different configuration of the lining carrier disc and the resultant installation position of the control disc 83, turned through 180°. Accordingly, the spring 81 corresponding to the spring 21" is seated with play in the circumferential direction in the windows 77, 79, while the windows 75, 99 are of equal size in the circumferential direction. The control disc 83 can otherwise be of configuration in conformity with FIGS. 5 to 8. For the explanation of the manner of operation of the rotationally elastic support and of the friction damper system reference is made to the description of FIGS. 1 to 8. The friction face pairs 87, 91 and 93 here correspond to the friction face pairs 35, 37 and 39.

While specific embodiments of the invention have been shown and described in detail to illustrate the application of the inventive principles, it will be understood that the invention may be embodied otherwise without departing from such principles.

I claim:

1. In a clutch disc for a motor vehicle friction disc clutch, comprising:
    (a) a hub part defining a rotation axis and having a first disc extending substantially radially of the rotation axis;
    (b) a disc part mounted rotatably through a limited maximum angle of rotation about the rotation axis on the hub part; said disc part being provided with clutch friction linings, and with at least one second disc arranged axially laterally of the first disc and extending substantially radially of the rotation axis,
    (c) several torsional vibration springs held in windows of the first disc and of the second disc, said torsional vibration springs being resiliently stressable in the relative rotation of the hub part and of the disc part, at least one of said torsional vibration springs being stressable with play in the circumferential direction to provide a multi-stage rotational elasticity characteristic,
    (d) a control disc arranged rotatably in relation to the hub part and the disc part axially between the first disc and the second disc, said control disc being coupled non-rotatably but with predetermined rotational play less than said limited maximum relative angle of rotation, with the first disc or the second disc and co-operates with said at least one torsional vibration spring being stressable with play in the circumferential direction,
    (e) friction face pairs pressed axially resiliently against one another, on axially both sides of the control disc, at least one first pair of said friction face pairs transmitting a friction torque between the first disc and the control disc and at least one second pair of said friction face pairs transmitting a friction torque between the second disc and the control disc, the friction torques of the first and the second friction face pairs being of different magnitudes, the improvement comprising the control disc being formed as an axially resilient component and being braced in by means of the first friction face pair and the second friction face pair between the first disc and the second disc.

2. A clutch disc according to claim 1, wherein the first friction face pair is arranged radially within the zone outlined by the torsional vibration springs and the second friction face pair is arranged radially outside this zone.

3. A clutch disc according to claim 1, wherein the friction torque of the second friction face pair is greater than the friction torque of the first friction face pair.

4. A clutch disc according to claim 1, wherein the control disc is formed as an axially acting spring part substantially of annular disc form and carries on its external circumference at least one radially protruding arm having a window co-operating with the torsional vibration spring.

5. A clutch disc according to claim 4, wherein the external circumference of the annular spring part carries a stiffening edge.

6. A clutch disc according to claim 5, wherein the arm extends obliquely of a plane intersecting the axis of rotation.

7. A clutch disc according to claim 5, wherein the arm is provided, at least in the region where it merges into the external circumference of the annular spring part, with bent stiffenings.

8. A clutch disc according to claim 4, wherein the spring part of annular disc form is formed as a dished spring in the region of its internal circumference.

9. A clutch disc according to claim 4, wherein the arm carries one of the friction faces of one of the two friction face pairs.

10. A clutch disc according to claim 9, wherein the arm carries one of the friction faces of the friction face pair with the greater friction torque.

11. A clutch disc according to claim 4, wherein one of the two friction face pairs is arranged in the region of the internal circumference of the spring part.

12. A clutch disc according to claim 1, wherein the disc part comprises two side discs firmly connected with one another and arranged on axially opposite sides of the first disc, one of said two side discs forming said second disc and the other of said two side discs carrying the clutch friction linings, both of said two side discs being provided with windows for the torsional vibration springs.

13. A clutch disc according to claim 12, wherein the first disc and said other of the two side discs are supported axially on one another through a third friction face pair.

* * * * *